No. 879,606.
PATENTED FEB. 18, 1908.
W. S. ADAMS.
BRAKE MECHANISM FOR CAR TRUCKS.
APPLICATION FILED JULY 27, 1907.
5 SHEETS—SHEET 1.
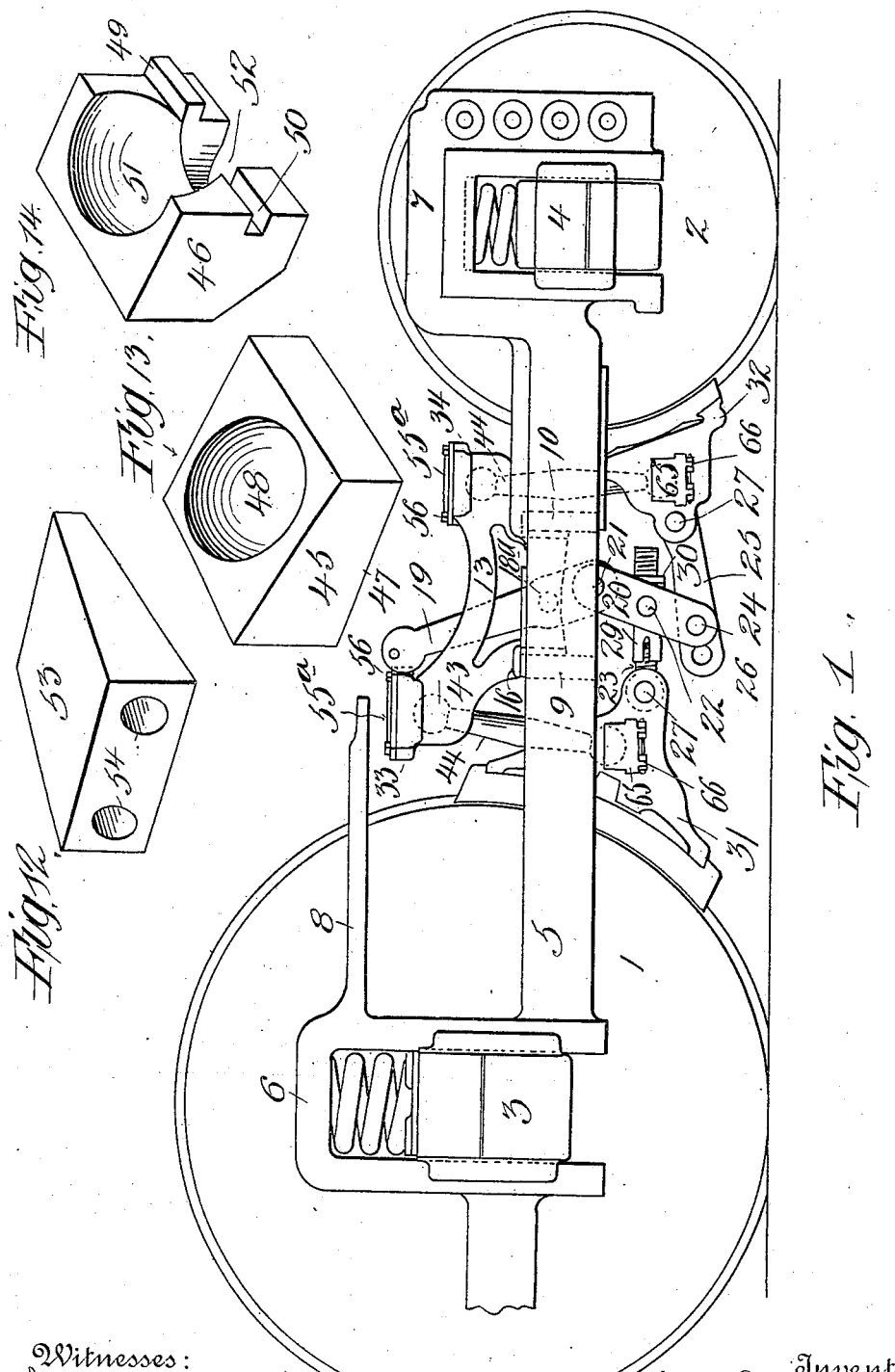

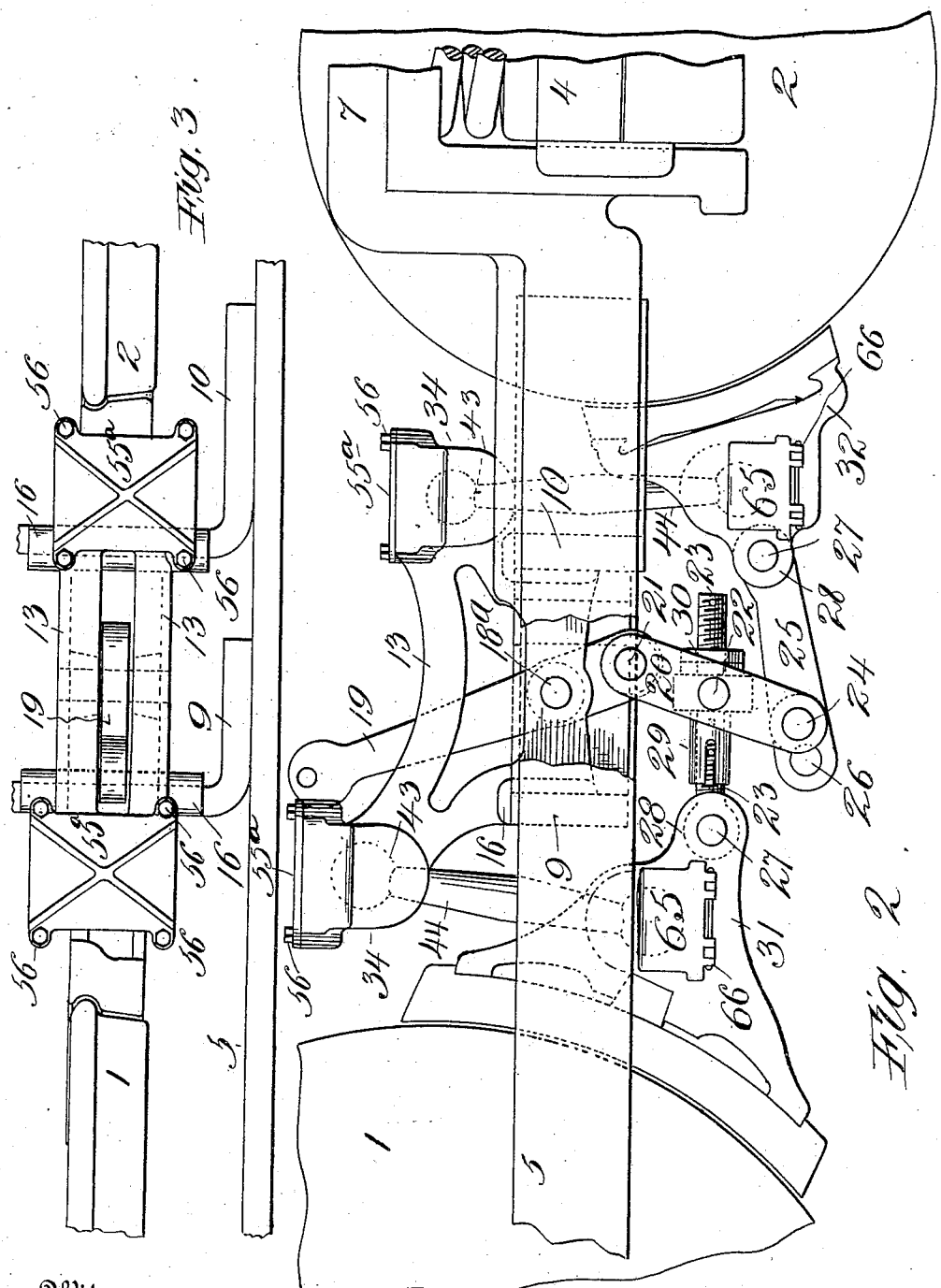

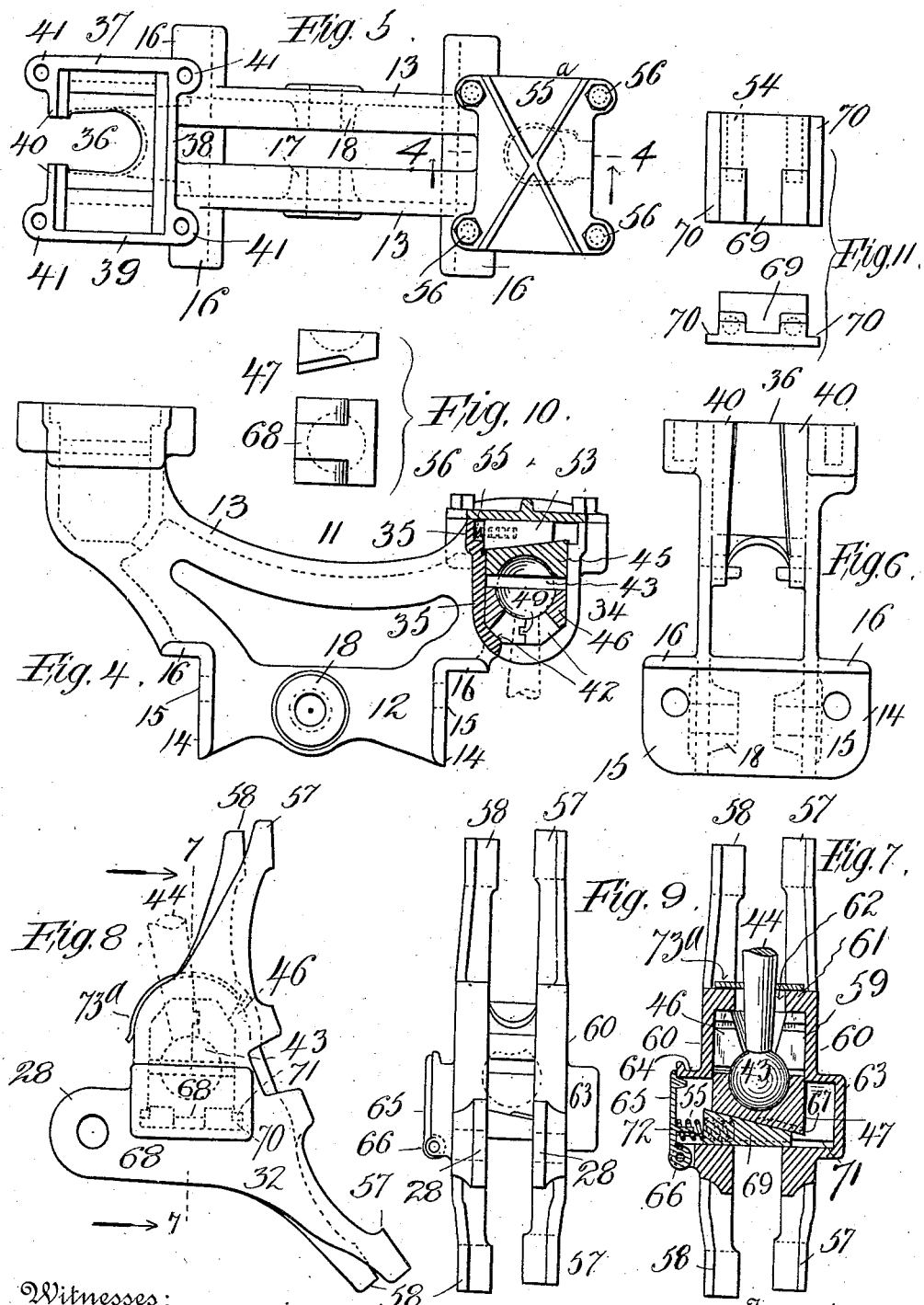

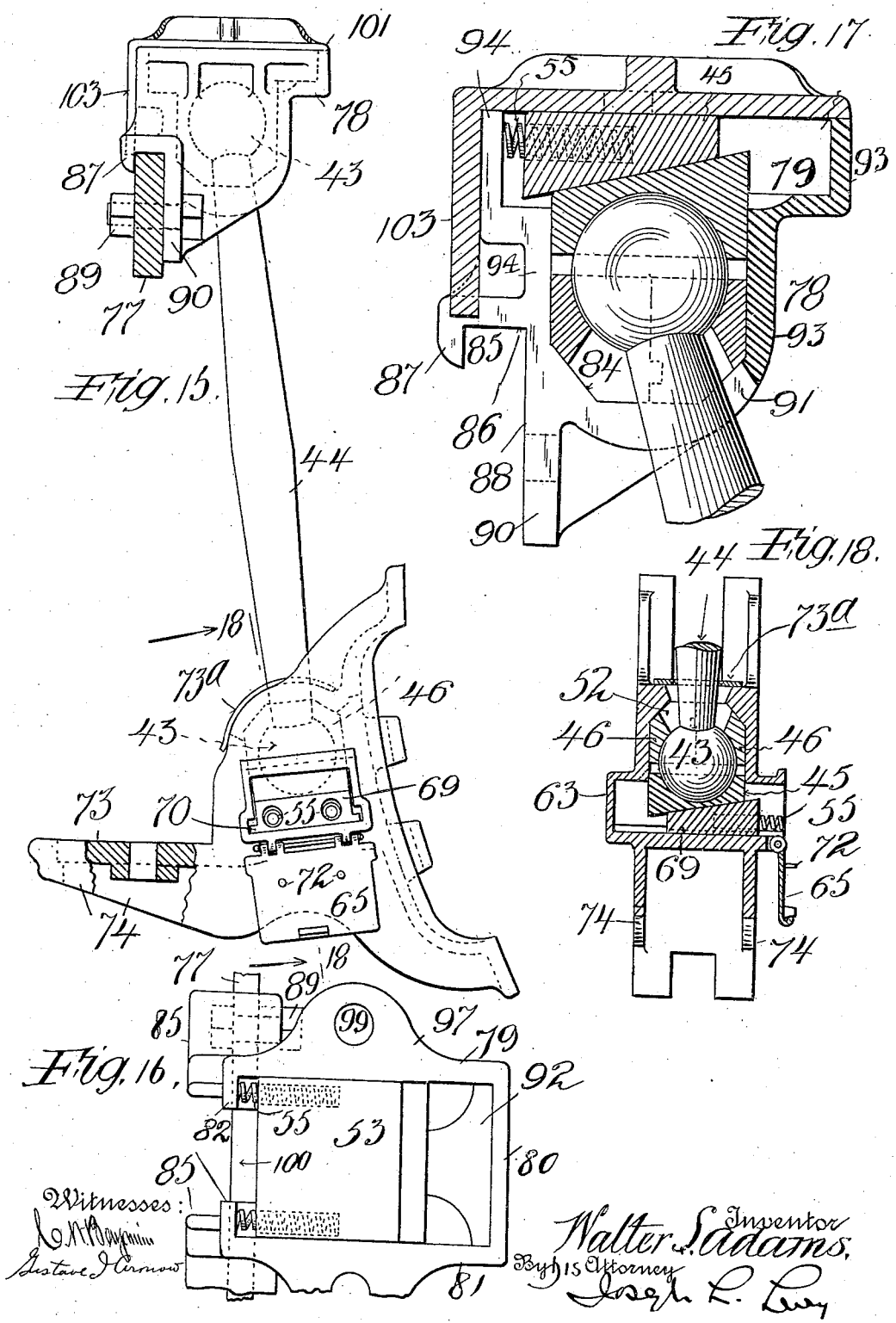

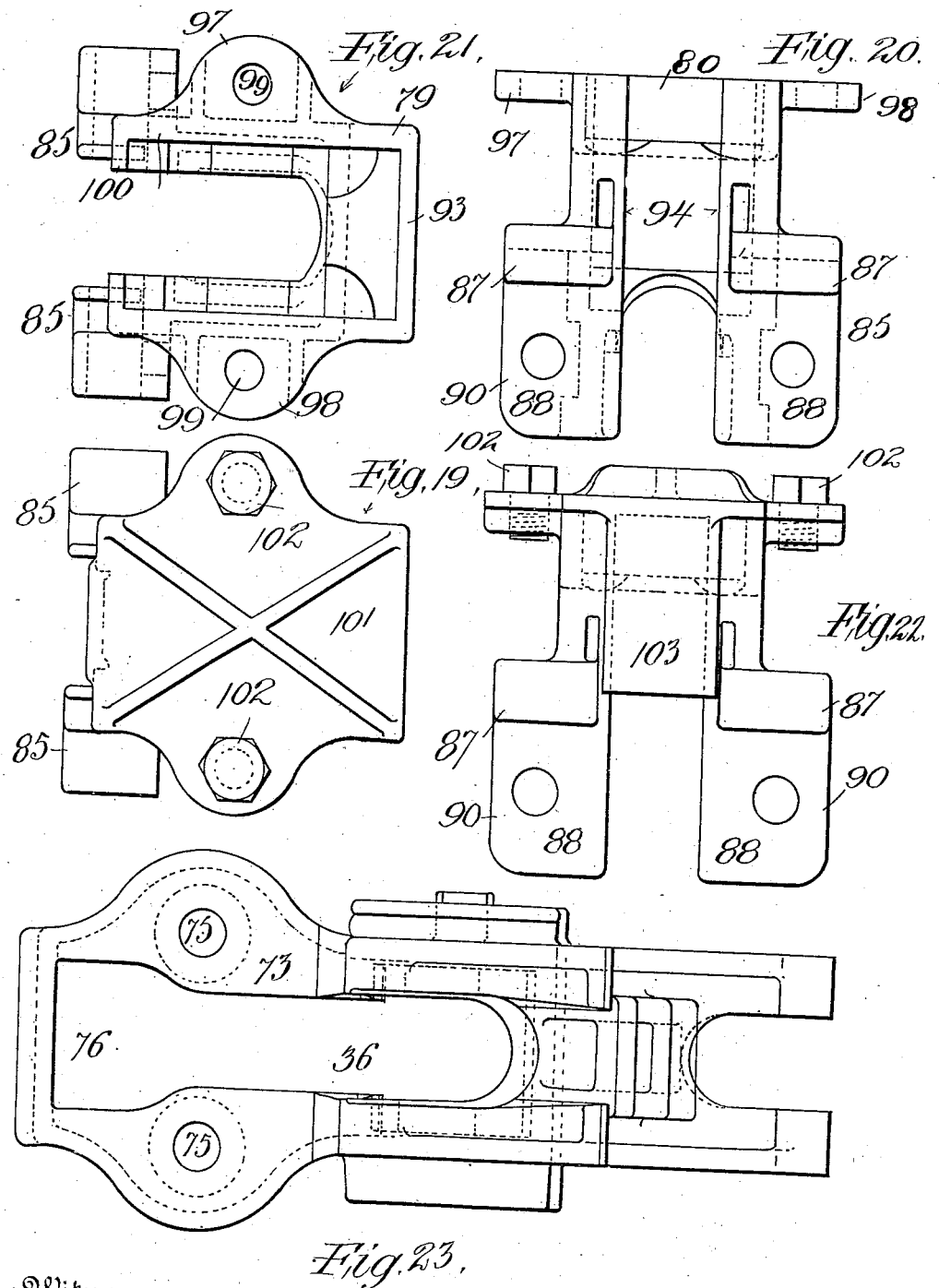

UNITED STATES PATENT OFFICE.

WALTER S. ADAMS, OF PHILADELPHIA, PENNSYLVANIA, ASSIGNOR TO THE J. G. BRILL COMPANY, OF PHILADELPHIA, PENNSYLVANIA, A CORPORATION OF PENNSYLVANIA.

BRAKE MECHANISM FOR CAR-TRUCKS.

No. 879,606.     Specification of Letters Patent.     Patented Feb. 18, 1908.

Application filed July 27, 1907. Serial No. 385,791.

*To all whom it may concern:*

Be it known that I, WALTER S. ADAMS, a citizen of the United States, and a resident of the city of Philadelphia, county of Philadelphia, and State of Pennsylvania, have invented certain new and useful Improvements in Brake Mechanism for Car-Trucks, of which the following is a specification.

My invention relates to brake mechanism for car trucks, and some of the features are particularly advantageous in that form of truck which is commonly known as a maximum traction truck, although the same may be embodied in trucks of other construction.

As the greatest advantages flow from its use in the maximum traction truck, I have illustrated my invention as applied to such a truck.

The object of my invention is to improve the efficiency of brake mechanisms by providing a brake lever connection, which is very compact and in which the pressure can be applied from the proper direction and may be applied with greater power on one set of wheels than on the other; also to provide for the taking up of the wear of the brake shoes by providing adjustments for that purpose and to provide a suitable supporting bracket for the double purpose of supporting the brake lever and guiding its upper end and also supporting the brake hanger.

Furthermore, my invention resides in the novel construction of a noiseless, non-chattering brake hanger. The advantages of the last mentioned features are that the casing of the bearing members is simplified and more easily assembled, and the non-chattering bearing for the lower end of the hanger is formed in the brake shoe holder in preference to the brake beam.

In the preferred form of construction, the brake hanger for both brake shoes, as well as the brake lever are hung from a bracket which is supported by one of the rigid members of the frame.

In the drawings forming part of this application, Figure 1 is a side elevation of a maximum traction truck with my improvements applied thereto. Fig. 2 is a side elevation, enlarged, of the brake apparatus. Fig. 3 is a plan view thereof. Fig. 4 is a section on the line 4—4 of Fig. 5. Fig. 5 is a plan view thereof in which one of the supporting pockets is without its top cover. Fig. 6 is an end elevation thereof. Fig. 7 is a section on the line 7—7 of Fig. 8. Fig. 8 is a side elevation of the brake shoe holder, showing the hanger in dotted lines. Fig. 9 is an end elevation of the brake shoe holder. Fig. 10 is a side elevation and inverted plan view of one portion of the bearing block. Fig. 11 is a plan and end view of the wedge block used on the lower end of the hanger. Fig. 12 is a perspective view of the wedge block used in the upper end of the hanger. Fig. 13 is a similar view of the upper half of the bearing block. Fig. 14 is a perspective view of one of two pieces which form the lower half of the bearing block, the two parts being alike and as shown in Fig. 14. Fig. 15 is a side elevation of a modified form of hanger showing the method of applying a hanger to a truck transom instead of to the bracket shown in the other views. Fig. 16 is a plan view thereof with the cap removed. Fig. 17 is a section through the top of the hanger. Fig. 18 is a section on the line 18—18 of Fig. 15. Fig. 19 is a plan view showing the cap in place. Fig. 20 is a front elevation of the top hanger support. Fig. 21 is a plan view thereof with the cap removed. Fig. 22 is a front elevation with the cap in place, and Fig. 23 is a plan view of the shoe holder.

The truck to which I have applied my preferred form of hanger consists of large wheels 1 and small or trailer wheels 2, having axle boxes 3 and 4 respectively. The side frame of the truck consists of a longitudinal bar 5, at each end of which is formed axle box yokes 6 and 7 engaging with the axle boxes 3 and 4, respectively. The upper bearing 8 is a guide for the spiral springs which support the car body, and which is not shown in the drawings. The entire construction of a truck of this character are described in a number of patents issued to Mr. John A. Brill and to myself.

For the purpose of providing a simple and rigid support for the brake mechanism, as well as for bracing the truck frame laterally, I provide transom bars 9 and 10 (see Fig. 3) which are secured to the side bar 5 of the truck and extend crosswise of the truck between the two bars 5 and are arranged parallel along that part nearest the brake mechanism. The transom bars 9 and 10 may be used to support the nose of the motor, if desired, in the usual manner.

The brake mechanism shown in my preferred mechanism is adapted to be hung from transom bars 9 and 10, so that the transom will support the brake lever as well as the brake shoe hangers. For this purpose I provide a bracket 11, shown in Figs. 4 and 5, which will serve for the purpose of supporting the parts of the brake mechanism. It consists of a vertical plate 12 having parallel bars 13 between which the brake levers operate, as will be seen hereafter, and at each end of the lower portion of the plate 12 I provide an L-shaped support 14 which has a vertical web 15 and a horizontal web 16, of sufficient dimensions laterally of the plate 12 to form a proper engagement with the sides and top of the two transom bars 9 and 10. The supporting brackets 14 are both the same except that they are disposed in reverse directions in relation to each other so that each of the webs 15 engage the opposite sides of the transom bars. Between these supporting brackets and on the plate 12, I provide sockets 17 & 18 which receive a pin, which serves as a fulcrum for the brake lever 19.

In describing the brake mechanism, I will describe the construction on one side of the truck as both sides are alike, the upper ends of the levers 19 being connected by a floating equalizing bar, in any well-known manner. The supporting bracket in its proper position is between the transom bars and on the longitudinal line of the truck wheels; the brake lever 19 is fulcrumed upon the pin 18$^a$ so that its upper end may be operated toward the small or trailing wheels 2, and during this operation the parallel bars 13 of the bracket serve to protect the lever 19 against lateral displacement. A second lever 20 is connected with both of the brake shoe holders and fulcrumed by a pin 21 to the lever 19. Below the pin 21, the lever 20 is fulcrumed by pin 22 to the brake rod 23 on the brake shoe holder of the large wheel and below this fulcrum it is connected by pin 24 to a link 25, which is similarly connected with the brake shoe holder of the smaller wheel. An extra aperture 26 is provided on the link 25 so that the connection of the lever 20 may be adjusted on link 25 to take up the wear of the brake shoes. Both the link 25 and the rod 23 are connected with their respective brake shoe holders by pins 27 which pass through the eyes on the ends thereof and through the ears 28 of the brake shoe holders between which the respective members 23 and 25 are supported. I prefer to provide further means for taking up the wear of the brake shoes, which is carried on the brake rod 23. It consists of a collar 29 which is threaded upon the rod 23 and to which the pin 22 is connected. Behind this collar is a nut 30 threaded to the rod 23 which may be screwed toward the brake shoe holder so as to take up lost motion due to the wear of the brake shoes.

As pressure is exerted upon the upper end of the lever 19 toward the small wheel, the upper end of the lever 20 will be rocked toward the larger wheel by reason of the fulcrum 18$^a$ of the lever 19 and the brake shoe holder 31 will be moved towards the larger wheel and the brake shoe holder 32 will be moved towards the smaller wheel. The rocking of the link 25 and the brake rod 23 will allow for the slight raising of the lower end of the lever 20.

Besides the novel features embodied in the bracket for supporting the brake levers, I have shown an improved method of supporting the shoe holders by a noiseless or non-chattering set of hangers which will continuously adjust themselves to take up the wear in the parts, thus providing against the disagreeable results experienced in brake hangers of the ordinary type, and also avoiding what is known in the railroad business as flat wheels. The supporting bracket is provided with a casing 34 for supporting the upper end of the hanger for the shoe holder of the large wheel and a corresponding casing for the hanger of the smaller shoe holder, the latter being preferably disposed below the plane for the former so that both links may be of the same length. The casings 34 are of similar construction as are also the links which they support, and the elements forming the bearing block, so that a description of one will serve as a description for both. The casing which is preferably cast integral with the supporting bracket has a shell 35 which forms an inclosure on three sides and a portion of the fourth side and openings 36 serve for the purpose of receiving the upper end of the hanger. The casing consists of four walls 37, 38, 39, and 40, from which at the upper edge extends ears 41 to which a cap is secured as will appear hereafter. The bottom of the casing is shaped substantially octagonal in cross section, as is shown in Fig. 4, so that the inclined surface 42 will receive and retain the lower half of the bearing block by which the upper end of the brake hanger is supported. The bearing block which receives and supports a ball 43 on the upper end of the hanger 44, is made of three parts, one of which 45 forms the upper half of the block, while two parts 46 form the lower half. The upper half is shown more clearly in Fig. 13. It consists of a block having an inclined upper surface 47 with a semi-circular recess 48 corresponding in size, with the spherical head of the brake hanger. The lower half of the bearing block consists of the two blocks 46 which are similar in all respects, as shown in Fig. 14, and on one side is a tongue 49 and on the opposite side there is a groove 50. As both halves are alike, the corresponding half 46 will also have a tongue and groove which will match the tongue and groove 49 and 50. There is formed in each of the halves a spherical recess 51, at the bottom of which is an aperture 52. The ball 43 of the hanger engages in the sockets 51 and the hanger projects through the aperture 52 when the parts are assembled together.

In Fig. 12 I have shown a wedged block used for the bearing at the top of the hanger. It consists of a wedge-shaped member 53 having on one end recesses 54 for the reception of springs 55, the latter being adapted to engage between the wedge block and the casing 35. I provide means for inclosing the parts at the top which consists, in each instance, of a cover 55ª which is more readily understood from the plan view. These covers are bolted by means of bolts 56 to the ears 41 of the several casings so that a substantially complete inclosure is made for the bearing block. The upper part of the hanger is assembled by inserting the head of the hanger into the casing through the openings 36 in the end of the casing, which opening is of less dimension than the ball 43. The two parts 46 are placed underneath the ball when their tongue and groove engagement will cause them to become like a solid block when they will rest against the inclined surfaces 42 of the casing, thus forming a solid resting place for the ball 43, and the aperture 52 being of sufficient dimensions to allow the hanger to move longitudinally of the truck for the operation of the shoes in and out of contact with the wheels. The upper half 47 of the bearing block is then placed over the ball so that the latter is received in the aperture 48 when the wedge block 53 is placed on top of it and the springs 55 are inserted in the apertures 54 so that their ends engage against the side of the casing and force the wedged block so as to cause the same to wedge between the cover 55ª and the block 47. As the bearing surface of the hanger and pockets begin to wear, the springs 55 by continually forcing in the wedge blocks keep the parts in close contact at all times, thus preventing any chattering or vibrating of the brake hanger. The lower end of the hanger is arranged in the casing formed in the brake shoe holder in a slightly different manner.

It is my object to embody in the preferred form the non-chattering bearing directly in the brake shoe holder as this not only economizes space in a truck of this character, but it also increases the efficiency of this kind of hanger. Heretofore it has been customary to apply a hanger to a brake beam which engages the two shoe holders. The construction of the brake shoe holder and the means for connecting the hanger is shown more clearly in Figs. 6, 7, 8, 9, and 11. As both shoe holders are almost identical in construction, a description of one will serve as a description for both. The shoe holder 32 is of the general form ordinarily used but with the outer arms 57 projecting forward a slight distance beyond the arms 58. This is so because the brake shoe proper is formed of a piece of material of uniform thickness which is pressed to conform in shape to a flange of the car wheel so that one side of the shoe projects rearwardly a slight distance beyond the outer side. Any means may be employed for connecting the shoe to its holder, and as such means are in common use, a detailed description is not necessary. The holder is formed with substantially rectangular opening 59 between the walls 60 of which is a part of the holder and the top is partially closed by a cross-piece 61 which has an opening 62 to allow a hanger to be inserted in the same manner as the aperture 36 in the upper casing. Below the pocket 59, there is formed by the projecting sides 63 and 64, a rectangular inclosure which communicates with the inclosure 59 and on one side of this inclosure there is a door 65 hinged at 66 to the side of the holder which serves as a protection for the working parts.

One half 46 of the bearing block is in all respects like the part 46 used in the construction at the upper end of the hanger and the lower half of the block 47 corresponds with the block 47 in the upper end of the hanger, except that it has on its lower and sliding surface a part 68 which travels in recess 9 of the wedge block for the purpose of preventing lateral movement of the bearing block.

The wedge block is provided with apertures 54, the same as the previous wedge block and is also provided with flanges 70 projecting at each side and traveling in the grooves 71 formed in the lower sides of the longitudinal pocket. The assembled parts at the head of the hanger, together with the block 46 is inserted by passing the shank of the hanger through the opening 62 into the pocket 59, after which the lower half 47 of the block is inserted so that its spherical recess will engage on the ball. The wedge block is then inserted in the longitudinal pocket below when its flanges 70 travel in the grooves 71 until the upper surface of the wedge comes in contact with the lower surface of the block 47 and forces it upward in contact with the ball. The springs 55 are then inserted in the apertures 54 when the cover 65 is closed and the springs are caused to force the wedge block in continuous contact with the bearing block. Inwardly projecting pins 72 on the interior of the cover 65 enter into the spiral springs and prevent them from being displaced.

For the purpose of inclosing the parts at the top, I provide a sheet metal cover 73ª which is circular in form and which surrounds the hanger and fits closely upon the upper surface of the part 61. The opening 62 being elongated, allows the hanger to move therein when the brakes are being operated and the cover 63 is adapted to move with the hanger. It will be seen that in a construction of this kind the shoe hanger is not only made noiseless by eliminating possibility of chattering, but the parts are so simplified that by opening doors in the sides, either half of the bearing block or the wedge block may be removed or replaced without interfering with the assemblage of the brake mechanism and may be done very quickly. Furthermore, the number of parts are reduced and may be cast in one complete casting, which is economical.

Other advantages flow from the use of the single bracket for supporting the brake hangers. It is of considerable advantage also to form the bracket in the manner herein shown and with the pockets for the brake hanger cast integral with the support for both hangers and in a single bracket. Furthermore, the particular form of brake leverage illustrated herein, is novel and advantageous, especially for car trucks of the maximum traction type. With the levers disposed as here shown, a greater pressure may be placed on the large wheels than on the smaller ones and the power may be applied to the brake lever in the direction of the small or trailing wheels while at the same time using inside hung shoes. Trucks of this sort when used in a car are placed at each end with the trailer wheels in the respective trucks toward each other and as the power is applied from the brake bar near the center of the car, it is necessary to apply the brake pressure through brake lever 19 toward the small wheels.

Heretofore it has been common to hang either or both of the brake shoes outside of the wheels in order to permit the brake lever being operated towards the small wheels. Whereas in this construction all the advantages of inside hung shoes may be secured as well as the advantages of having differential pressure on the larger wheels. The latter is desirable as in trucks of this kind, the greater portion of the weight of the car is carried by the larger wheels.

In the construction shown in Figs. 15 to 23 inclusive, I have shown a modification of my improved hanger which relates more particularly to the shoe holder and to the pocket at the top of the hanger. In this construction, the shoe holder, together with the bearing blocks of the various parts are made the same as in the previous construction except that in addition thereto I have provided a rearwardly projecting horizontal plate 73 formed preferably integral with the shoe holder. Depending from the sides of the plate 73 are stiffening plates 74 forming a bracket-like construction which makes the plate 73 strong and substantial. Apertures 75 are provided in the plate which are adapted to receive bolts and the plate is preferably provided with the large opening 76 running longitudinal of it. The purpose of this rearwardly projecting plate is to form a support on which is connected a brake beam for the purpose of connecting the brake shoe holders on the opposite sides of the truck so as to cause the shoes to move in unison and from a single source of power. Such a construction is not necessary in my previously described hanger, as the bar for the shoes on the opposite sides of the truck is equalized by connecting the upper ends to the lever 19. The support for the upper end of this hanger is adapted to be secured directly to the transom bar 77 of the truck as in my previously described form so that the advantages of my hanger may be employed in what is known as single truck and other constructions. In this instance, the casing 78 is formed of a cast piece of metal having sides and ends 79, 80, 81, 82, to form a rectangular pocket corresponding with the pocket in the first form of hanger. Ears 97 and 98 extending laterally from the top are provided for the purpose of securing the cap 101. The opening 100 allows the hanger 44 to be inserted in the casing in the same manner as the opening 36 in the first form. Inclined surfaces 84 at the bottom are adapted to retain the bearing blocks in the same manner, as before. Outwardly extending brackets 85 having a top plate 86 and a depending flange, 87, are preferably cast integral with the casing so that the face 88 of the casting may be placed against the side of the transom bar 77 and the bracket 85 will support the entire hanger, the depending flange 87 connecting over the edge of the transom bar. The bolts 89 pass through the transom bar and the lower plate 90 of the casting for securing the parts against displacement. In this construction the hanger is the same as before, as well as the bearing blocks. The opening 91 allows for the movement of the hanger the same as before. The lower part of the casting is formed with a rectangular pocket directly below the previously described pocket and with which it communicates. This pocket is formed by the ends 93, 94, and sides 95 and 96. The wedge block in this case has springs inserted in the end of the upper bearing block and it is covered with a cap 101 secured over it by bolts 102 which pass through the ears 97 and 98. The cap 101 is provided with a depending end 103 which closes the opening 100 when the parts are assembled. In a casting formed in this manner, hangers may be supported from any bracket or from a member of the truck frame proper.

Having described my invention, what I claim is:—

1. A brake mechanism comprising a plurality of brake shoes, the lever fulcrumed to operate the said shoes in opposite directions, and a second lever fulcrumed to the said first mentioned lever and a stationary fulcrum for said second lever beyond its point of fulcrum with the first lever.

2. A brake mechanism comprising a plurality of brake shoes, a lever fulcrumed so as to operate said shoes in opposite directions, a second lever fulcrumed to a support and connected to said first lever, the said levers between the stationary fulcrum of the second lever and the connection of the first lever with the brake shoes forming a toggle lever connection.

3. A truck provided with inside hung brake shoes, a lever fulcrumed so as to operate said shoes in opposite directions, a second lever fulcrumed to a support and having its end fulcrumed to the said first lever.

4. A brake mechanism, comprising a brake lever fulcrumed to a support another lever having one end fulcrumed to said operating lever, and brake shoes, said second lever being fulcrumed beyond its point of connection with the operating lever, so as to move the brake shoes in opposite directions.

5. A brake mechanism comprising a brake lever fulcrumed to a support and adapted to be operated from one end, a second lever fulcrumed to the operating lever on the end opposite the operating end, and brake shoe holders, said second lever, being fulcrumed to the brake shoe holders beyond its fulcrum with the operating lever, whereby the second lever will move the brake shoe holders in opposite directions.

6. A brake mechanism comprising an operating lever fulcrumed to a support, brake shoe holders, a second lever, fulcrumed to an element of one of said brake shoe holders, the operating lever and said second lever being fulcrumed together between the said stationary fulcrum of the operating lever and the connection of the said second lever with its shoe holder, the second shoe holder being connected with said second lever between its point of connection with the first mentioned shoe holder and the operating lever.

7. A brake mechanism comprising brake shoes, a lever adapted to move said shoes in opposite directions and an operating lever having a stationary fulcrum, said levers being connected together between the said stationary fulcrum, of the operating lever and the point of connection of the second lever with the brake shoes.

8. A brake mechanism comprising an operating lever fulcrumed to a stationary support, a second lever fulcrumed to one end of said operating lever, a brake shoe holder connected to the free end of said second lever, and a second brake shoe holder connected to the said second lever equidistant between the points of connection of the operating lever and said first brake shoe holder.

9. A brake mechanism comprising a pair of brake shoe holders, each having brake rods fulcrumed thereto, a lever fulcrumed to each of said brake rods, an operating lever fulcrumed to a support and having its end fulcrumed to said first mentioned lever between the said stationary fulcrum of the operating lever and the points of connection between the said first lever and the said brake rods.

10. A brake mechanism comprising a pair of brake shoe holders each having a brake rod fulcrumed thereto, a lever fulcrumed to said brake rods by an adjustable connection, and an operating lever having a stationary fulcrum and adapted to rock said first lever.

11. A truck having inside hung brake shoes, a lever adapted to force said shoes apart and against the truck wheels, and a second lever having a stationary fulcrum, said second or operating lever being connected to the first lever so as to rock the latter, said levers being adapted to rock in reverse directions.

12. A car truck having a transom composed of a plurality of bars, brake mechanisms for said truck and a bracket supported between the transom bars and forming a support for the brake mechanism.

13. A car truck having a frame, brake mechanism including a brake lever, and hangers and a bracket secured to a part of the truck frame and supporting the brake lever and hangers.

14. A car truck having a frame, including transom bars, a brake mechanism including a brake lever and brake shoe hangers, and a bracket supported between the transom bars and supporting the said brake lever and hangers.

15. A car truck, brake mechanism therefor, including an upright brake rod, a bracket secured to the truck frame and supporting the brake mechanism, said bracket having bars which straddle the upper end of the brake rod.

16. In a brake mechanism, a brake hanger, a brake shoe holder having a casing, and an adjustable bearing block for the hanger and bearing block, the said casing inclosing the end of said hanger and the adjustable bearing block.

17. In a brake mechanism, a brake hanger having an enlarged head, a brake shoe holder having a casing adapted to receive the enlarged end of the said hanger adjustable bearing blocks in said casing, a wedge block for said bearing blocks, the shoe holder having a side opening for the reception of said wedge block and a cover for closing said side opening.

18. In a brake mechanism, a brake hanger having an enlarged head, a brake shoe holder having a casing adapted to receive the enlarged end of the hanger, an adjustable bearing block in said casing, a wedge block for said bearing blocks, the said shoe holder having a side opening for the reception of the wedge block, a hinged door for said side opening and a spring interposed between said door and wedge block.

19. In a brake mechanism, a brake hanger having an enlarged head, a brake shoe holder having a vertically disposed chamber and horizontally disposed chamber communicating with the vertical chamber, an adjustable bearing block in said vertical chamber and extending into the horizontal chamber, a wedge block in the horizontal chamber, adapted to act on the bearing block, the shoe holder having an opening for the insertion of the said wedge block.

20. In a brake mechanism a brake hanger having an enlarged head, a brake shoe holder having a casing adapted to receive the head of the brake hanger, an adjustable bearing block for the hanger in the said casing, a wedge block in the casing, and grooves in the casing, with which the wedge block engages and which determine the movement of the wedge block.

21. In a brake mechanism a brake hanger having an enlarged head, a support for the hanger comprising a casing containing bearing and wedge blocks for the hanger, said casing having a bracket adapted to support the casing upon a car truck member.

22. In a brake mechanism, a brake hanger, having an enlarged head, a support for the hanger comprising a casing having horizontal opening for the reception of the said hanger and a cap for said casing having a depending plate for covering the opening when said hanger has been inserted in the casing.

23. A brake mechanism comprising a brake shoe holder having a casing in which is secured a brake hanger, and a plate extending to the rear of the casing and adapted to be secured to a brake beam.

Signed this 25 day of July, 1907.

WALTER S. ADAMS.

Witnesses:
A. CLEMENT WILD,
WM. J. FERDINAND.